Dec. 18, 1934.   F. SINGER ET AL   1,984,603
EXTRUSION PRESS
Filed April 14, 1934   9 Sheets-Sheet 1

Fig. 1

INVENTORS
Fritz Singer
Alfred Lieberges
By Brown, Critchlow & Flick
Their attorneys.

Dec. 18, 1934.    F. SINGER ET AL    1,984,603
EXTRUSION PRESS
Filed April 14, 1934    9 Sheets-Sheet 7

Patented Dec. 18, 1934

1,984,603

UNITED STATES PATENT OFFICE 1,984,603

EXTRUSION PRESS

Fritz Singer and Alfred Liebergeld, Nuremberg, Germany, assignors to Tubus A. G., Zurich, Switzerland Application April 14, 1934, Serial No. 720,597
In Germany February 15, 1932

16 Claims. (Cl. 207—3)

This invention relates to extrusion presses of the type which embody mutually reciprocable male and female extruding tools, and particularly to those in which the female die is actuated by a main crank drive and the male tool by subsidiary driving means.

This invention relates especially to improvements in certain features of presses of the kind disclosed in a copending application of Adolf Wefing filed March 7, 1934, Serial No. 714,421. Prior to that invention the presses available either embodied a crank drive disposed in the head of the frame, or they were of the bottom slide drawing type having cranks disposed outside of the frame for actuating a movable cross head in the upper part of the frame. Presses of the first type require the frame to be built very heavily, while those of the second type exert such heavy stresses on the movable cross head and the press columns that they must be of massive construction.

In accordance with the invention of Adolf Wefing referred to, the female extrusion tool is actuated by a crank drive disposed within the bottom of the frame, considering a vertical press for purposes of reference to these parts, and the male tool is arranged in the head of the frame and is actuated by a subsidiary driving means. The female tool, or die, is supported on a carrier member having a bore aligned with the die opening, and the carrier is connected to the crank by a pitman member which is hollow to provide a passageway for the extruded article. Such a pitman may comprise a connecting rod member connected at its lower end to the coaxially aligned pins of two cranks, the connecting rod being provided with a bore aligned with that of the die carrier, and with a slot to the bore through one side. Or, for example, with a 3-bearing crank it may comprise a pair of spaced connecting rods.

Preferably that invention is embodied in presses in which the male tool, such as a ram, or a punch and mandrel, is reciprocated by a subsidiary driving means. Relatively small pressure forces are required to advance the tools into their working position, and the piercing operation necessitates only a fraction of the pressure force required for the extrusion proper. Hence, as far as the driving power itself is concerned, the subsidiary driving means could be of comparatively light construction. But the tools moved by the subsidiary driving means must bear the total extrusion pressure and in consequence the subsidiary driving means necessarily must be as heavy as the main drive which is, of course, undesirable. Accordingly, while that construction is practical, and embodies substantial advantages and satisfactorily overcomes disadvantages and difficulties theretofore encountered, there remains the problem of lightening the subsidiary driving means.

A major object of the present invention is to provide presses of the type referred to in which during extrusion the load on the subsidiary driving means is reduced to that required for moving the tool, or is substantially eliminated, whereby the subsidiary driving means may safely be made only as heavy as necessary for reciprocating the tool into and out of its operating positions.

For purposes of description the invention will be described with particular reference to the production of tubing, but it will be understood that it is not restricted thereto, being applicable also to extrusion of other articles, such as rods, shapes, etc.

According to the present invention the problem of supporting, during the extrusion proper, the counter-tool, or male extrusion tool, moved by the subsidiary driving means is overcome by actuating the tool through a hydraulic system which includes a fixed cross head as one of its elements and which is operated and controlled by mechanical means from the main crank drive. The application of hydraulic means to this end is so related to the operation that during extrusion the load is applied through hydraulic cushioning to the fixed cross head. In one aspect of the invention the load is wholly borne by the cross head, so that the subsidiary driving means is wholly eliminated during extrusion, while in another embodiment the load on the tool is applied both to the stationary cross head and the subsidiary driving means by the aid of hydraulic cushions whose cross sectional areas are so proportioned that during the extrusion proper only such part of the total extrusion pressure as corresponds to the driving power of the subsidiary driving means will be transmitted to the latter. In both embodiments the subsidiary driving means need be heavy enough only to withstand the forces applied in moving the tool mechanism into its working positions.

The invention may be described with reference to the accompanying drawings, showing two embodiments of the invention, and in which.

The invention may be practiced in various ways, two of which are shown in the accompanying drawings as applied to the manufacture of metallic tubes, e. g., of ferrous materials, using a male die comprising a mandrel and a punch. According to the embodiment of Figs. 1 to 5 the subsidiary driving means is actuated and controlled by cam mechanism associated with the main drive and related parts, while the mandrel carrier forms a type of twin hydraulic system in which the mandrel carrier is cushioned in part against a stationary cross head, and in part against a movable cross head reciprocated in the axis of the tools and forming part of the subsidiary driving means, the extrusion stresses being so proportioned in this cushioning system that the subsidiary driving means carry only such part of the stress as corresponds, approximately, to the necessary force applied through the subsidiary means for moving the male tool.

Having reference now to Figs. 1 to 5, the press comprises a vertical frame 1 in the lower part of which a pair of crank shafts 2 and 2a is mounted symmetrical and coaxilly to each other with their inner ends journalled in bearings 3 and 3a in the bottom part of the press frame, and their outer ends in bearings 4 and 4a mounted outside of frame 1. The cranks are rotated by spur gears 6 and 6a, Fig. 1. The crank pins 8 and 9 of the crank shafts 2 and 2a, respectively, are mounted coaxially and rotatively within suitable bores provided in the lower end of a connecting member 10 which is rotatably connected by wrist pins 11 to a hollow billet-and-die carrier 12 which is guided in ways 13 for vertical reciprocation in the frame. Carrier 12 carries a billet container 14 in which is disposed a die 15, and it is provided with a longitudinal bore 16 aligned with the die opening for downward movement of the extruded article. Connecting member 10 likewise is hollow, with its bore 17 aligned with bore 16, and on one side a slot is formed for an outlet channel 18 pivotally mounted at its upper end on wrist pins 11. Thus there is provided a passageway for free downward extrusion of the tube. The connecting member 10 may also be made of two separate parts, or connecting rods, arranged at a sufficient distance from each other to render possible the free exit of the extruded article. As may be seen from Fig. 1, carrier 12 is hollow at its lower end, for reception of the connecting member.

The head part of the press includes a stationary cross head 19 from which there projects downwardly a fixed piston member 20 provided with a bore 21, the axis of the piston and bore being aligned with the axis of tool movement.

The male tool comprises a hollow punch 22 carried by a hollow punch holder 23 vertically reciprocable in ways 24 in frame 1. Movable as a piston within the punch holder is a mandrel holder 25 from which mandrel 26 extends downwardly through the punch. The mandrel holder is provided with a downwardly extending bore of such diameter as to receive fixed piston 20 and it is further provided with an upstanding cylindrical wall 260 whose height is somewhat greater than that of the wall of the mandrel holder, and whose outer diameter equals the diameter of bore 21 of fixed piston 20. Thus the outer wall of the mandrel carrier and its inner wall 260 form a cylinder for the fixed piston, and the mandrel holder and piston form a hydraulic system serving as a safety device for the press, the operation of which will appear fully hereinafter.

The lower part of the mandrel holder 25 is reinforced to form an annular abutment 27 which coacts with an abutment ring 28 mounted on the punch holder, as by means of the screws 29, so as to limit the relative movements between mandrel carrier 25 and punch carrier 23.

Turning now to the subsidiary driving means for the male tool, a pair of identically shaped cams 30 and 30a are mounted on cranks 2 and 2a, respectively, between press frame 1 and the corresponding spur gears. Cams 30 and 30a act on rollers 31, 32 and 31a, 32a, respectively, symmetrically arranged to each other (Figs. 1 and 2) in carriers 33 and 33a, respectively. The roller carriers are guided by means of arms 34, 35 and 34a, 35a having bores slidably receiving guide rods 36, 37, and 36a, 37a, respectively, vertically arranged on the press frame.

The roller carriers 33 and 33a, respectively, are connected to a movable cross head 38 by means of the rods 39, 39a, respectively, guided in the bearing members 40 carried by the stationary cross head 19.

Movable cross head 38 is disposed above the fixed cross head and depending from the former is a piston 41 the lower reinforced end of which tightly fits the bore 42, of interior cylinder, formed by wall 260 of the mandrel holder, these two elements forming a hydraulic system to serve as a further safety device for protecting the driving means of the mandrel holder 25 from overloading. Mounted on piston 41 is a hollow cap screw 43 the cap of which is of a diameter equal to that of bore 21 of fixed piston 22. This cap screw is bored throughout and slipped on the shaft part of piston 41, and the shaft part of the cap screw is provided with an outer thread to be screwed into a corresponding inner thread of the cylinder 260 of the mandrel holder 25. The cap screw together with the annular abutment formed by the reinforced part 44 of piston 41 is provided for regulating the lowermost position of the mandrel holder with regard to piston 41.

In the vertical press construction as shown the punch holder 23 because of its weight constantly tends to take its most remote position from the mandrel holder, in which position the hollow punch encases mandrel 26. It is, however, desirable to have the mandrel clear after each operation so as to be able to cool it and at once to detect any defect thereof. For this purpose a device is provided as described hereinafter.

On the vertex of the cross head 38 there is provided a horizontal bearing 45 in which there is pivotally mounted a double-armed lever 46. The longer arm 46' of this lever is pivotally connected to one end of a rod 47 the other end of which is pivotally connected to an upstanding lug 48 on punch holder 23 (Figs. 2 to 5). The end of the shorter arm 46'' of lever 46 is positioned to coact with a lug 49 adjustably mounted on a screw spindle 50 by means of nuts 51 and 52.

The hydraulic devices pertaining to the subsidiary drive illustrated in Figs. 2 to 5 serve on the one hand as a safety device and on the other hand to eliminate the ultimate part of the crank stroke from the extruding operation proper. These devices include a source of hydraulic pressure, a non-return valve, a second combined valve adapted to act under some conditions as non-return valve and operated by special devices under other conditions to provide for flow of pressure water, and the necessary piping. Coacting with these subsidiary hydraulic devices is a safety valve not shown in the drawings, connected with the cylinder spaces 42 and 53.

Bore 54 within piston 41 connects the cylinder space 42 (within wall 260 of the mandrel carrier) with a pipe 55 the reinforced vertical end of which is shaped to form a piston 56 which fits the bore of a stationary pressure water pipe 57, so that pipe 55 is able to follow the movements of cross head 38 and piston 41 is able to maintain a fluid-tight connection between the cylinder space 42 and the pipe 57, which latter is connected with a pipe 58 connected at one end to a safety valve, not shown, and at the other end to a non-return, or one-way, valve 59 whose valve 60 is so disposed as to remain closed when over-pressure exists in pipe 58. The chamber of the non-return valve containing the valve spindle is connected with a pipe 61 leading to a valve 62. A branch 63 from pipe 61 terminates in a portion extending vertically downward for receiving the piston-shaped end 64 of the vertical part of a pipe 65 having a horizontal run connected to cylinder space 53, this portion of pipe 65 extending through a slot 66 (Fig. 3) formed in punch holder 23.

Valve 62 is of a combined type. It is carried by a bracket 67 connected to the press frame. The valve is divided into an upper chamber 68 and a lower chamber 69 by a partition wall provided with an opening 70 controlled by a valve disc 71. The lower end of the valve spindle 72 projects through a bore in the lower wall of chamber 69 and its outer end carries a disc 73 which acts as an abutment to support a spring 74, and also to form the working point of a device later to be described and adapted to lift the valve spindle against the action of spring 74.

Valve chamber 69 is connected by a pipe 75 to a pressure water supply, or accumulator, 76 whose contents are acted upon by a weight 77 through a piston 78. Accumulator 76 receives the water displaced from the cylinder space 53; and it also supplies water to the cylinder spaces 42 and 53 in case the pressure in the pipes 63 and 57 should drop below the pressure existing in the accumulator.

In order to eliminate the low-speed portion of the crank stroke during the ultimate part of the stroke, the mandrel holder must follow the movement of the die-carrier during such part of the stroke. This is effected by lifting valve disc 71, whereby the pressure water in the cylinder space 53 is allowed to flow back into the accumulator. To this end the following means are included. A bracket 79 is fastened by means of screws 80 to the billet- and die-carrier 12, and in a bore of the bracket there is mounted a threaded spindle 81, parallel to the tool axis, by means of a nut 82. A slide block 83 is movably guided on the spindle. Pairs of nuts 84 and 85 adjustably mounted on the spindle form abutments which when contacting the slide block transmit the movement of the spindle to the slide block. A pin 86 horizontally projecting from the slide block moves in a slot 87 in a lever 88 pivotally connected to a lug 89 projecting downwardly from valve 62. The part of lever 88 near the pivot point is shaped as a cam 90 to transmit the rotation of the lever to valve stem 72 through the disc 73.

In the drawings, a designates the billet, b the extruded article, and c the pressing residue.

Figure 1:
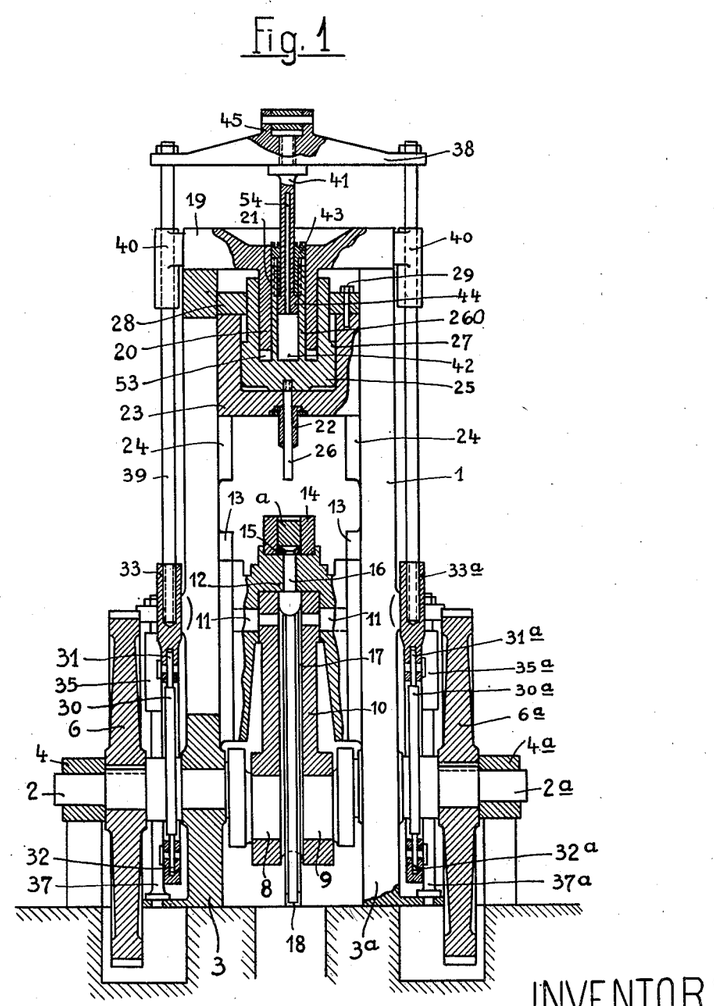
Fig. 1 is a front elevation of one embodiment, partly in section, showing the press parts and tools in their initial positions.
Figure 2:
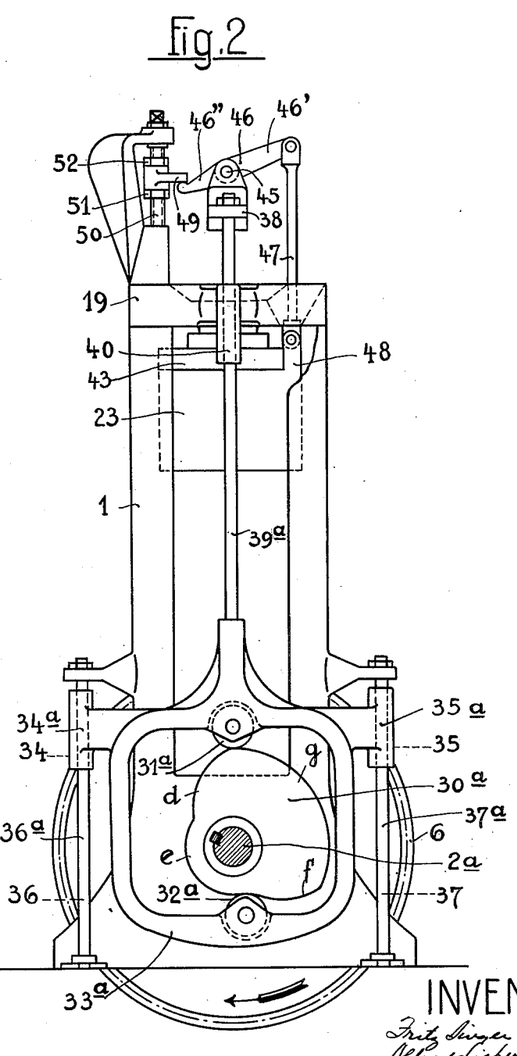
Fig. 2 a side elevation of a portion of the press shown in Fig. 1 with the parts and tools in the same positions, one of the main drive gears being omitted for clarity of illustration.
Figure 3:
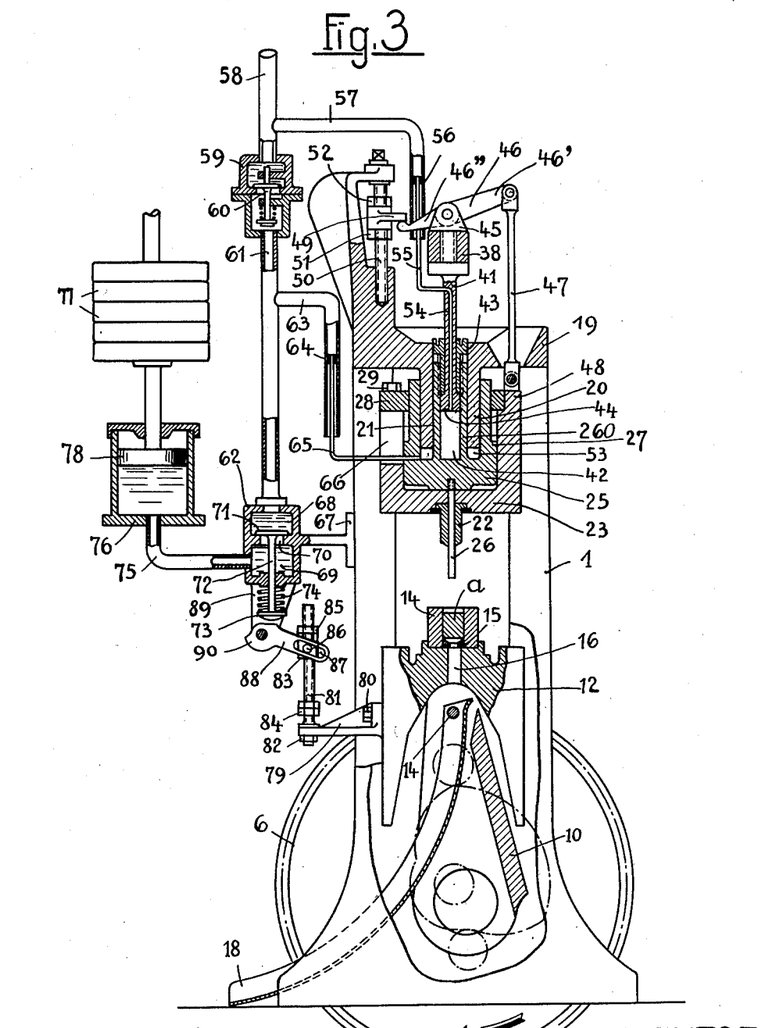
Fig. 3 a sectional side elevation, partly in section, of the press with the press parts, tools and subsidiary hydraulic devices in the positions shown in Figs. 1 and 2.

The press operates as follows:

In the initial position of the press the crank pins 8 and 9 are 30° before the lower dead point (Fig. 3). Punch 22 and mandrel 26 are in their uppermost position; valve 62 is closed. The heated and descaled metal billet a is inserted into container 14 and the main drive is started to set the press into motion through spur gears 6 and 6a. The crank shafts rotate in the direction of the arrow, and the cranks at first descend into their lower dead point position, so that the billet and die-carrier 12 within the first phase of movement is not raised, but actually descends.

Cams 30 and 30a are shaped in such a manner (Fig. 2) that after setting the press into motion the roller carriers 33 and 33a, rods 39 and 39a, movable cross head 38, and piston 41 are at once moved downward. As the cylinder space 42 is closed by the non-return valve 59, and by the safety valve, during the descent of piston 41 no pressure water can escape from the cylinder space 42. The mandrel holder 25, is therefore, compelled to follow the downward movement of piston 41. Lever 46 simultaneously descends with the cross head 38, and since punch holder 23 is suspended from the lever it also participates in the downward movement, and being suspended on the longer arm 46' of the lever, the punch holder descends by gravity with greater speed than the cross head 38, piston 41, and mandrel holder 25, until the annular abutment 28 on the punch holder contacts the annular reinforcement 27 of the mandrel holder. The result is that punch 22 slips over mandrel 26 until the ends of the mandrel and the punch will come to lie in a plane and almost simultaneously contact billet a.

Due to the descent of the mandrel holder an under pressure is created within the cylinder space 53, which causes the valve 62 to open so that water flows from the accumulator through the pipes 75, 61, 63 and 65 into the cylinder space 53.

Figure 4:
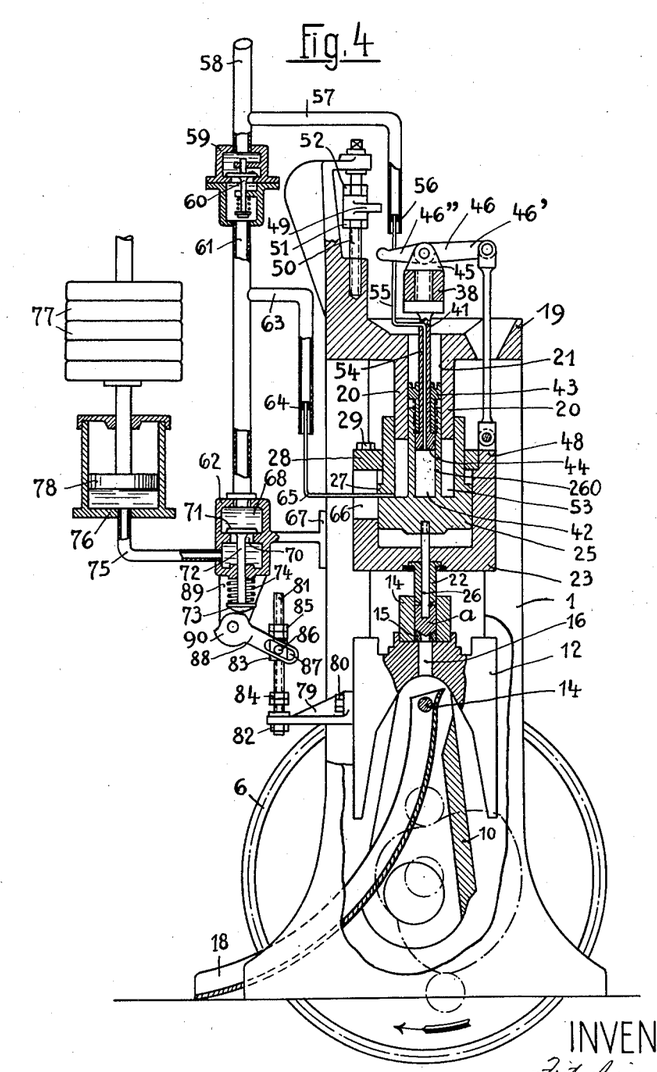
Fig. 4 a view similar to Fig. 3 showing the press parts and tools in positions after the punch carrier and the mandrel carrier have finished their working stroke.
Figure 5:
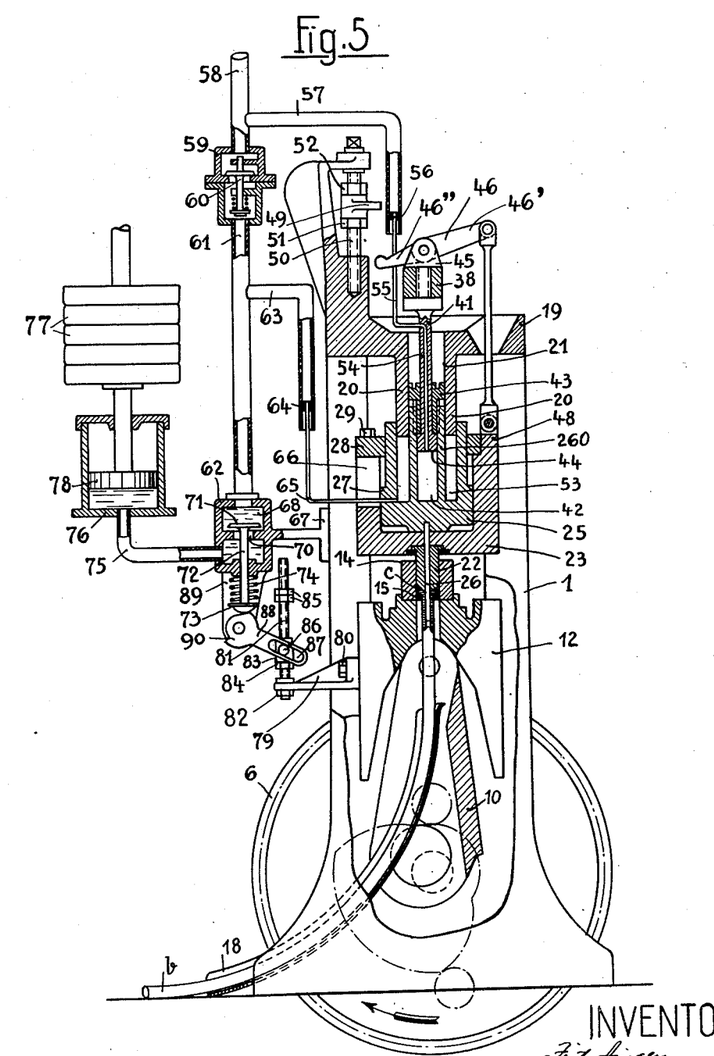
Fig. 5 a view similar to Fig. 4 showing the press parts and tools in the positions attained after extrusion.

When the cranks have passed about 60° of the crank cycle, with regard to their initial position, viz., about 30° away from their lower dead point position, the rollers 31, 32 and 31a, 32a will have passed the uniform cam portions d and f of the cams 30 and 30a, and the roller carriers 33 and 33a, movable cross head 38, piston 41, and mandrel holder 25 will have reached their lowermost positions (Fig. 4). At this moment the billet is not yet completely pierced by the mandrel.

During the following phase of stroke including the crank cycle from 30° away from the lower dead point position to 30° before the upper dead point position the billet a will be completely pierced and extruded down to a thin-walled residue. The ultimate part of the piercing operation and the extrusion are accomplished exclusively by the upward movement of the billet- and die-carrier 12, which causes punch 22 first to be lifted until the bottom of mandrel holder 25 contacts the bottom of the punch holder. Only at this moment the extrusion proper begins. During this part of the stroke the rollers 31, 32 and 31a, 32a pass the cam portions e, g, shaped in such a manner that during this part of the stroke the positions of the roller carriers and of the machine parts attached to the roller carriers are not changed.

Since the water in the cylinder spaces 53 and 42 cannot escape due to the arrangement of the non-return valves 59 and 62, and since the cylinders are connected with a safety valve, the press is secured against overloading during the piercing operation by the intermediary of the pressure water cushion in cylinder space 42, and during the extrusion operation it is protected by the intermediary of the pressure water cushions in cylinder spaces 53 and 42. The cross sectional areas of the cylinder spaces 42 and 53 are so proportioned that only such part of the total extrusion pressure as corresponds to the driving power of the subsidiary driving means will be transmitted to the subsidiary driving means for the mandrel and the punch (rods 39, 39a, cams 30, 30a). The main part of the extrusion pressure is transmitted by the hydraulic cushion in space 53 to the stationary cross head 19.

At the moment when extrusion has been completed, viz., about 30° before the upper dead point position (Fig. 5), the pair of nuts 84 of the threaded spindle 81 contact slide block 83 to engage lever 88. Cam piece 90 is shaped so that by a slight turning of lever 88 valve disc 71 is lifted, which results in pressure water being allowed to flow out of the cylinder space 53 through the pipes 65, 63 and 61 and through valve 62 and pipe 75 back into the accumulator 76.

During the part of the stroke that includes the crank cycle from 30° before the upper dead point position to the upper dead point position, the mandrel holder is subjected to the action of the hydraulic pressure in the accumulator. The pressure of the water supply is proportioned only so high as to maintain the cylinder spaces 42 and 53 completely full in this part of the crank stroke, so that the billet and die carrier 12 has to overcome only comparatively small counter-pressure in order to lift the punch and mandrel holders. In order to make the pressure water escape from cylinder space 42 during this part of the crank stroke, devices may be provided to lift valve spindle 60 simultaneously with the opening of the non-return valve 62. The cams 30 and 30a may be shaped also in such a manner that at the beginning of this part of the crank stroke the lower rollers 32, 32a are not in engagement with the cams, so that the roller carriers and the machine parts attached to the latter are allowed to be lifted freely. Therewith it is of advantage that in this part of the crank stroke the latter is very small.

During the back stroke including the crank cycle from the upper dead point position to 30° before the lower dead point position, carrier 12 is returned into its initial position. The rollers 31, 32 and 31a, 32a pass the cam portions d, e, f, g, wherein the cam portions d and f act in a direction reverse to that of the forward stroke, so as to return the roller carriers 33 and 33a, movable cross head 38, piston 41, mandrel holder 25 and punch holder 23 into their initial positions. In the first phase of the back stroke the punch holder does not at once follow the upward movement of the mandrel holder, but under the influence of gravity participates in the downward movement of billet and die-carrier 12 until abutment ring 28 of the punch holder again contacts annular reinforcement 27 of the mandrel holder. Thereby the tube b (Fig. 5) is slipped off from the mandrel by the punch.

As soon as the end of the short lever arm 46″ abuts against lug 49, the punch holder is elevated at the same rate of speed at which it is descended at the beginning of the stroke. During the ultimate part of the back stroke carrier 12 completes the return into its initial position, whilst the roller carriers and the machine parts connected to them, especially the mandrel carrier and the punch carrier, remain in their previously-reached final positions. When the pair of nuts 85 towards the end of the back stroke contact slide block 83 lever 88 is caused to swing downward whereby disc 73 becomes disengaged from the projecting portion of cam 90, thus permitting spring 74 to close the non-return valve 62. The press is now ready to begin another cycle.

Thus it will be seen that the press provided by the invention embodies a main crank drive for one of the tools, and a subsidiary drive for the other tool actuated and controlled by mechanical means from the main drive. Further it will be seen that in accordance with this embodiment of the invention overloading is prevented by hydraulic cushions which distribute the extrusion load in such manner that the subsidiary means carries only such proportion thereof as corresponds to the force applied through that means for moving the tools. In this embodiment the mandrel carrier acts, or works in, a hydraulic twin cushion system to that end. The advantages will appear to those skilled in the art.

The invention is not restricted to the embodiment shown in Figs. 1 to 5, i. e., to cam actuation of the subsidiary driving means, or to hydraulic cushioning in which the extrusion forces are distributed in part to the subsidiary drive, as in that embodiment. The benefits of the invention may be obtained by other means also. For example, in the embodiment shown in Figs. 6 to 9 the entire extrusion load is absorbed through a single hydraulic apparatus acting against a stationary cross head, the movable cross head of the preceding embodiment is eliminated, and the press includes crank actuation of the subsidiary driving means.

More particularly in this second illustrative embodiment, which likewise illustrates the invention as applied to making tubing, the mandrel carrier acts as a hydraulic cylinder with respect to a fixed piston carried by a fixed cross head. The cylinder is connected to a hydraulic pressure apparatus which includes a piston operated by a second crank operated from the main crank drive, so that the hydraulic pressure apparatus is applied to advancing the counter tools into their various working positions, and to piercing the billet, or only to the latter purpose.

This construction offers the advantage that the lengths of the strokes of the different driving means can be proportioned very small, so as to obtain a very concentrated and light press construction.

A further advantage of this construction follows from the interposition of hydraulic pressure means in the subsidiary crank drive, whereby the latter is eliminated and unstrained during the extruding operation. Thus the subsidiary crank drive can be hydraulically secured against overloading during the piercing operation also. Moreover, the crank actuation of the subsidiary driving means provides for transmission of considerably higher pressure forces than can be transmitted by the cam drive shown in Figs. 1 to 5, which may be of advantage for some purposes.

As in the preceding embodiment, a die and billet container 100, enclosing a die 101, supported by a carrier 102 vertically reciprocable in guides 103 carried by frame 104. Carrier 102 has a longitudinal bore 105 aligned with that of the die and container. The carrier is connected by wrist pins 106 to a pair of connecting rods 107 and 107a spaced to provide a passage for extrusion of the tube from bore 105. Thus this portion of the press is similar to that of the preceding embodiment. In this instance, however, there is illustrated the use of a double crank of the three-bearing type. It consists of the cranks 108 and 108a rotatably connected to connecting rods 107 and 107a, respectively. The crank shafts 109 and 109a, and the middle part 110, are journalled in bearings 111, 111a and 112, respectively. Spur gears 113 and 113a connected to crank shafts 109 and 109a provide the main crank drive, these gears being driven by any suitable means, not shown. An outlet channel 114 (Fig. 7) for the extruded tube is disposed in the passageway with its upper end pivotally carried by pins 106.

The head of press frame 104 carries a stationary cross head 115 from which depends a fixed piston 116 provided with a central bore 117. As in the preceding embodiment, a hollow punch 118 is carried by a hollow punch holder 119 reciprocable in guideways 103, and a mandrel 121 projects slidably through the punch from a mandrel holder 122 vertically movable within punch holder 119. The mandrel holder is hollow and receives fixed piston 116, forming a hydraulic cylinder therefor.

On an arm 123 of mandrel holder 122 there is mounted the lower end of a piston rod 124 which extends upwardly through a vertical bore in cross head 115 and carries at its upper end a piston 125 slidable in a hydraulic cylinder 126 mounted on the cross head, to provide a hydraulic apparatus for lifting and lowering the mandrel carrier, as will appear hereinafter. The lower end of cylinder 126 is connected by a piping 127 with a constant pressure water supply, not shown. The upper end of this cylinder is connected by a pipe 128 with the constant pressure water supply or to a waste line 129, as need be, through a 3-way valve 130.

A double-armed lever 131 is pivotally connected to a lug 132 on arm 123 of the mandrel holder. The lever arm adjacent the tools is bifurcated with the branches enclosing the mandrel holder and connected at their inner ends pivotally, as by means of pins 133 to the upper ends of levers 134 the lower ends of which are pivotally connected to the punch holder by pins 135. The outer arm of lever 131 carries at its end a roller 136 for coaction with an extension 137 of cross head 115 which forms an abutment for roller 136. The lever further is provided with an abutment screw 138 adjustable by means of a nut 139 and coacting with an abutment surface 140 arranged on arm 123.

Figure 7:
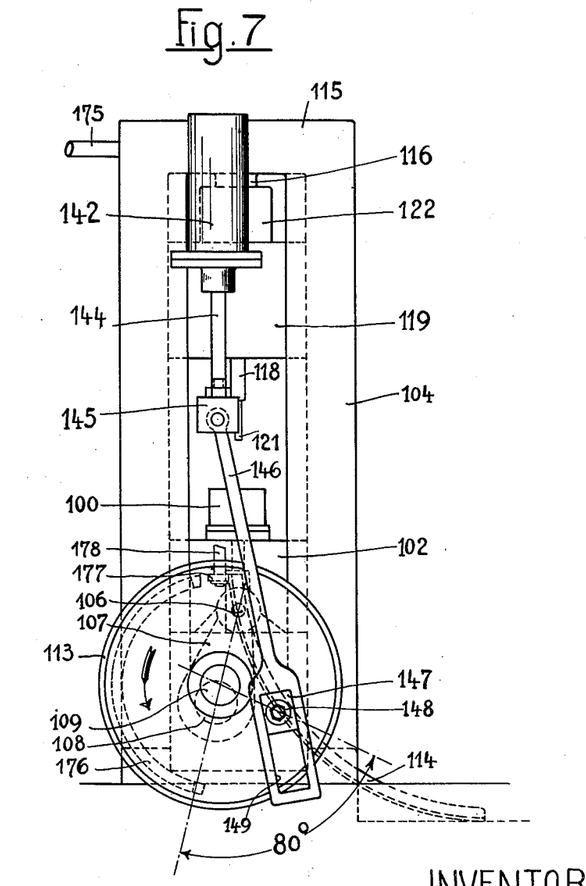
Fig. 7 a side elevation of a portion of the press shown in Fig. 6, with the press parts and tools in the positions shown in Fig. 1.
Figures 8, 8A:
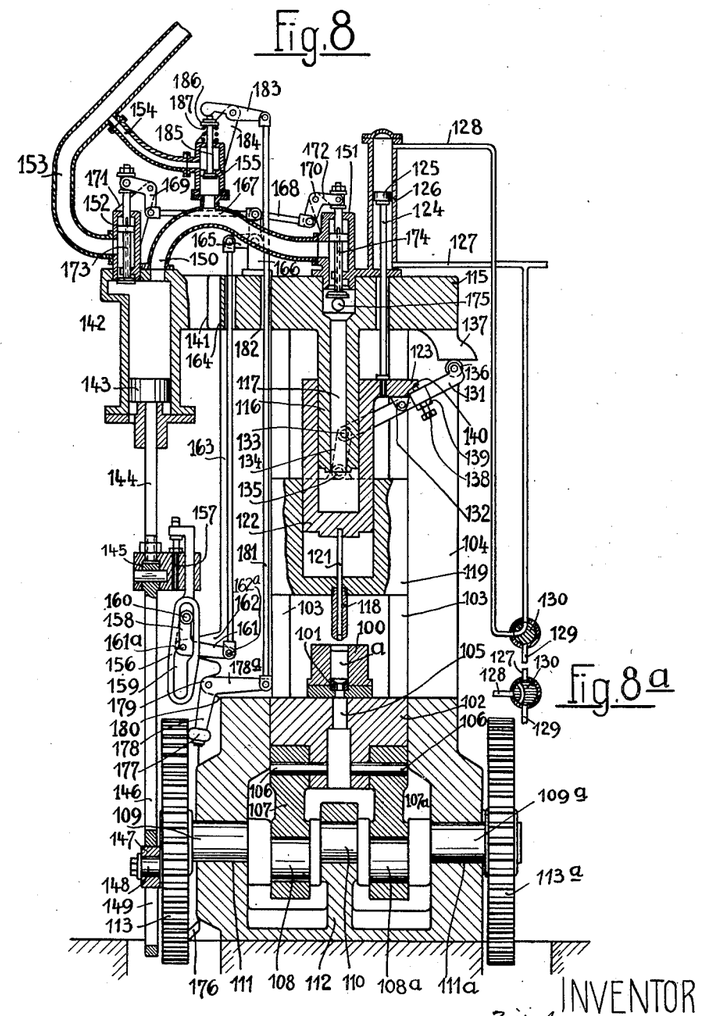
Fig. 8 a sectional view similar to Fig. 6 showing the press parts and tools after advancing the punch and the mandrel into their working positions.
Fig. 8a a view similar to Fig. 6a showing the valve in still another position.

On a lateral extension 141 of cross head 115 is mounted the cylinder 142 of a hydraulic apparatus having a piston 143 connected to the upper end of a piston rod 144. The lower end of the rod is connected to a cross head 145 pivotally connected to the upper end of a crank rod 146. The lower end of crank rod 146 (Fig. 7) is shaped to provide a slot 149 in which there is guided a slide block 147 rotatably carried by a crank pin 148 mounted on spur gear 113 (Fig. 7). The crank pin 148 is shifted about 80° with regard to the main cranks 108 and 108a.

The upper end of cylinder 142 is connected by a pipe 150 with a valve 151 which opens into bore 117 of fixed piston 116. Another valve 152 is mounted at the upper end of cylinder 142. Valves 151 and 152 are mechanically operated and constructed in the manner known in the art so as not to be subject to pressure. Valve 152 is connected by a pipe 153 with a low pressure water supply, not shown. Pipe 153 is connected by a pipe 154 and a mechanically operated non-return valve 155 to the pipe 150.

For controlling the valves 151, 152 and 155 the following controlling devices are provided. A slot frame 156 is arranged to be adjusted vertically by an adjusting screw 157 carried by cross head 145. This slot is divided into two parallel laterally shifted portions 158 and 159 which engage a roller 160 rotatably mounted on the free end of one arm of a bell crank 161 pivoted on a lateral extension 162 of press frame 104. The other end of the bell crank 161 is rotatably connected by a pin 162a to the lower end of a rod 163 guided in a vertical bore 164 of the fixed cross head 115 and connected at its upper end with the horizontal arm of another bell crank 165, which is pivotally mounted in a lug 166 on cross head 115. The end of the other arm of the bell crank 165 is pivotally connected to one end of each of two rods 167 and 168. The other ends of rods 167 and 168 are connected to the bell cranks 169 and 170, respectively, which are pivotally mounted in lugs 171 and 172 carried by the valves 152 and 151, respectively. The other arms of bell cranks 169 and 170 are respectively linked to the stems 173 and 174 of valves 152 and 151. Valve 151 is connected below the valve disc to a pipe 175 leading to a safety valve, not shown.

For the purpose of controlling the non-return valve 155 the following cam-lever gearing is provided. On the side of spur gear 113 facing the tool axis there is mounted a cam 176 which engages a roller 177 rotatably mounted on the pin-shaped end of the vertical arm 178 of the bell crank 179 which is pivoted to a lateral extension 180 of the press frame. The other, horizontal arm 178a of the bell crank 179, is pivotally connected to one end of a rod 181 guided in a vertical bore 182 in the fixed cross head 115, and the upper end of the rod is connected to one arm of a double-armed lever 183 which is pivoted on an extension 184 of the valve 155. The other arm of lever 183 is ball-shaped for engagement with the end of the stem 185 of valve 155. On stem 185 there is mounted a disc 186 which forms an abutment for a coil spring 187 which tends to keep valve 155 normally closed.

Figures 6, 6A:
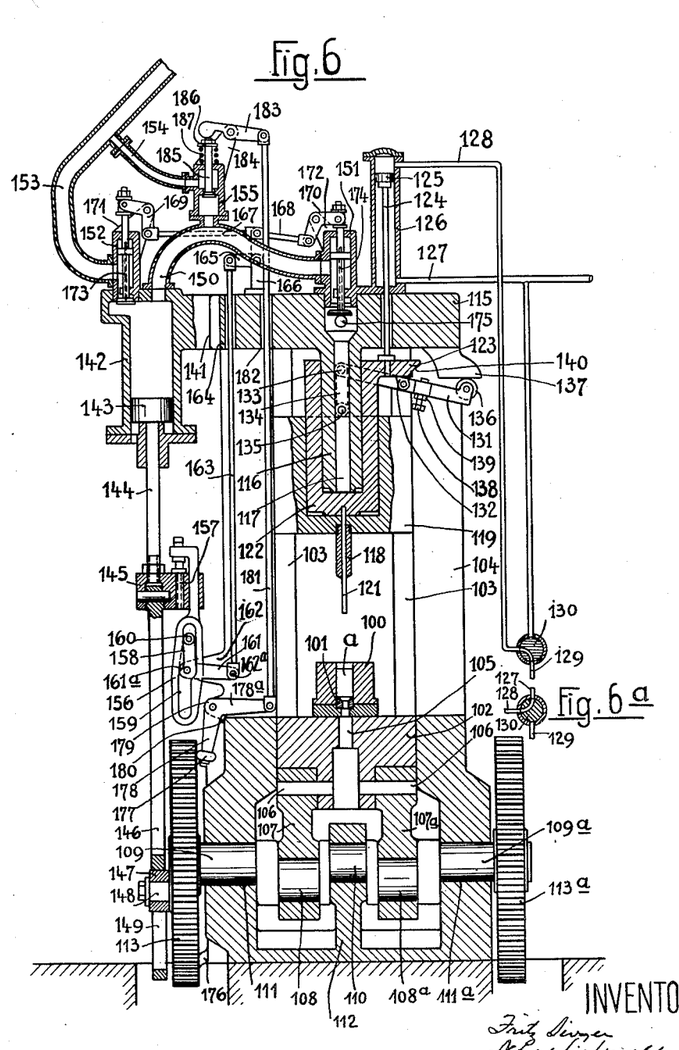
Fig. 6 a vertical sectional view from the front of a press according to another embodiment of the invention, showing the press parts and tools in their initial positions.
Fig. 6a a schematic sectional view through one of the valves shown in Fig. 6, but in a different position.

The press operates as follows:

In the position of the press parts and tools shown in Figs. 6 and 7 the cranks 108 and 108a are at their lower dead point, whilst the crank pin 148 is transposed, with regard to the cranks, by about 80° in the direction of their rotation. Pipe 128 is connected with waste-water pipe 129 through the three-way valve 130. The mandrel and punch holders are in their uppermost positions. Valve 151 is open, whilst the valves 152 and 155 are closed. Piston 143 is in its lowermost position.

After inserting the metal billet a into container 100, the three-way valve 130 is turned into the position shown in Fig. 6a. Equal pressure therefore exists below and above the piston 125, so that the mandrel holder 122 begins to descend by gravity. The descending speed of the mandrel carrier may be regulated by arranging a throttle disc within pipe 127. Due to the under pressure created within the bore 117, valve 155 is caused to open and low pressure water flows from the low pressure water supply through pipe 153, valve 155, pipe 150, and valve 151 into the bore 117.

The punch holder 119 being suspended on the mandrel holder by means of the double-armed lever 131, the punch holder begins its downward movement simultaneously with the mandrel carrier but running ahead of it. As soon as the mandrel holder has reached a position shown in Fig. 8, the three-way valve 130 is turned into the position shown in Fig. 8a which causes the mandrel holder to stop. The relative movement of the punch holder with regard to the mandrel holder is limited by abutment screw 138, which is adjusted so that after mandrel 121 has reached its working position the ends of the mandrel and the punch will lie almost in the same plane.

Then the press is set into motion. The billet- and die-carrier 105 and the piston 143 simultaneously begin their upward movement, the former through connecting rods 107 and 107a, and the latter through crank 148 and rods 146 and 144. The pressure fluid contained in cylinder 142 is thereby forced through pipe 150, the opened valve 151 and bore 117 into the bore of the mandrel holder, thus causing the latter to descend. The punch holder at first follows this movement of the mandrel holder until it contacts the billet a, when it is lifted by the material displaced by the piercing mandrel while the mandrel holder continues its forward movement.

In proportion as the piercing operation proceeds, the distance between the mandrel holder and the punch holder decreases so that at the end of the piercing operation the mandrel holder contacts the bottom of the punch holder. As the cranks 108 and 108a begin to move out of their lower dead center position, die 101 and the billet at first are lifted very slowly. The subsidiary crank 148 reciprocating piston 143 of cylinder 142 begins to move toward the end of the first quadrant of the crank cycle, that is with the highest speed, and the cross sectional area of piston 143 and the stroke of the crank pin 148 are proportioned in such a manner that the piercing operation will be finished after about 45° of the crank movement, so that the piercing of the billet is effected in the main by the downward movement of the mandrel holder and only partly by the stroke of the billet- and die-carrier.

Figure 9:
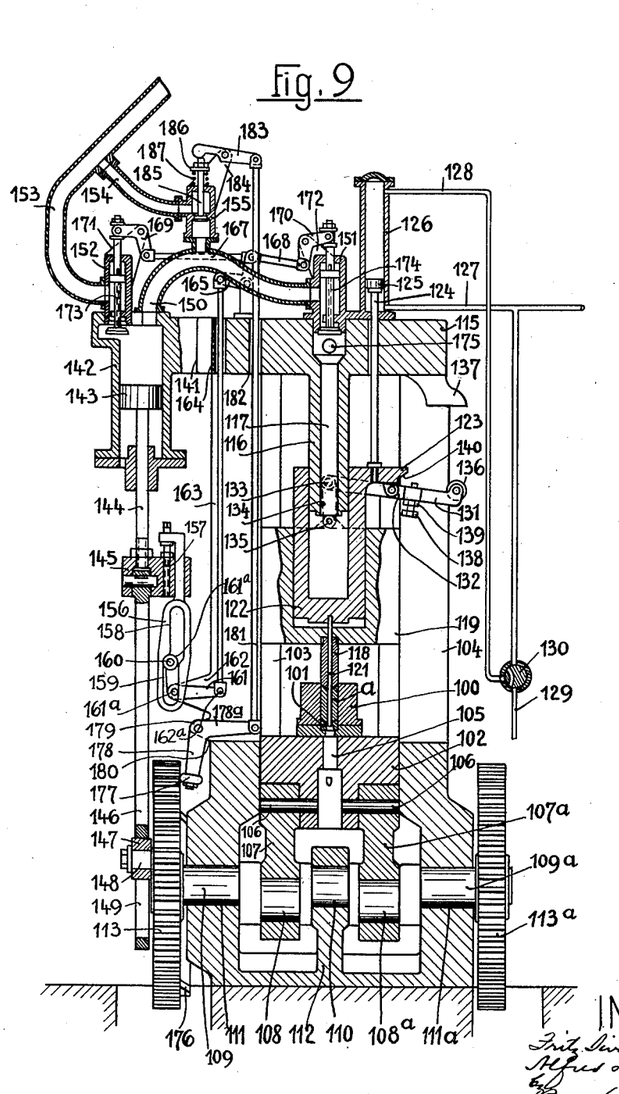
Fig. 9 a sectional view similar to Figs. 6 and 8, showing the press parts and tools after the piercing operation.

Slot frame 156 is mounted on cross head 145 so that it also participates in the movements of piston 143. This causes the guiding slot 158 to slide over roller 160 of bell crank 161. Shortly before or after the piercing operation has been finished, the roller passes the oblique part 161a forming the connection between the guiding slots 158, 159, which causes the bell crank 161 to be turned counter-clockwise and the bell crank 165 to be turned clockwise. The clockwise rotation of the latter is transmitted to the bell cranks 169 and 170 in such a manner that valve 152 will be opened and valve 151 will be closed (Fig. 9). At this moment the mandrel holder and the punch holder have finished their stroke.

During the following phase the billet a is extruded exclusively by the upward movement of carrier 102, the pressure water cushion between the mandrel holder 122 and fixed piston 116 serving as safety device. Piston 143 at first continues its upward movement after the shutting off of valve 151, causing the pressure water to flow through the opened valve 152 and pipe 153 into the low pressure water supply.

According to the arrangement of the main cranks 108, 108a and the subsidiary crank 148, as shown in the drawings, crank pin 148 passes upper dead center when the main cranks have completed 115° of the crank-cycle movement. The cranks 108, 108a now are 65° before their upper dead center position, and whilst they have still to execute an essential part of their working stroke, the subsidiary crank 148 has already begun its return stroke, which causes piston 143 to descend and also causes low pressure water to flow back through pipe 153 and the opened valve 152 to cylinder 142. As piston 143 and the cross head 145 move downward, guide slot 159 of frame 156 slides downward over roller 160, and when crank pin 148 has passed about 70° away from its upper dead center position the roller passes the oblique part 161a of the slot. At this moment the main cranks 108, 108a have not only reached but crossed their upper dead center position by about 5°. The roller 160 being linked into the guide slot 158 the valve 151 is caused to open and the valve 152 to close.

Cam 176 is shaped and arranged on the spur gear 113 in such a manner that, at about the same time as the valve 151 is opened and the valve 152 is closed, it contacts the roller 177 and pushes it away, causing the valve 155 to be opened through the action of rod 181 and associated mechanism. Simultaneously valve 130 is turned into the position shown in Fig. 6, which causes pressure water to flow through pipe 127 into the lower part of cylinder 126, whereby piston 125 and the mandrel holder are forced up. In proportion as the mandrel holder is lifted low pressure water escapes from the bore of the mandrel holder through bore 117, valve 151, pipe 150, valve 155 and pipes 154 and 153 into the low pressure water supply.

The punch holder at first does not participate in the upward movement of the mandrel holder, but descends together with carrier 102. As soon, however, as abutment screw 138 contacts abutment surface 140 on arm 123 the punch holder is returned into its initial position by the upward movement of the mandrel holder.

When piston 143 in its return stroke has contacted the bottom of cylinder 142 the crank rod is no longer able to follow the downward movement of crank pin 148. During the remaining part of the back stroke of crank pin 148 the latter slides together with slide block 147 within slot 149 of crank rod 146, at first downwards, then upwards back into its initial position. Towards the end of the back stroke roller 177 disengages from cam 176, whereby spring 187 becomes effective to lift valve stem 185 and thus to close valve 155. Simultaneously the left arm of the double-armed lever 183 is elevated, the rod 181 is pressed downward and bell crank 178 is turned clockwise so as to press roller 177 to that part of its surface of contact on the spur gear 113 which is not provided with a cam.

By this time the press parts and tools are again in their initial positions (Fig. 6).

In lieu of operating the mandrel holder by means of the hydraulic apparatus 142, 143 only for the purpose of executing the piercing operation, the same means may be applied to advancing of the tools into their working positions. For this purpose it is necessary only to increase the cubic capacity of the hydraulic apparatus, as, for instance, by enlarging the cross sectional area of piston 143 so that the apparatus is capable of delivering the additional pressure fluid required for the advancing of the punch and the mandrel into their working positions. With this construction the valve 130 and pipe 128 will become unnecessary. The cylinder 126 being connected by means of pipe 127 to a constant pressure water supply, the pressure of which is precisely sufficient to lift up the mandrel holder and the punch holder into their initial positions against the gravity thereof and to hold them in these positions, the hydraulic apparatus 142, 143 has additionally to overcome only such pressure as is required for causing the lifting of the mandrel holder and the punch holder. As soon as the valves 151 and 155 are opened, after extrusion has been finished, the mandrel and punch holders are automatically returned to their initial positions by the piston 125, since only the low pressure of the low pressure water supply connected to pipe 153 exists in the cylinder space of the mandrel carrier.

According to the provisions of the patent statutes, we have explained the principle and mode of operation of our invention and have illustrated and described what we now consider to represent its best embodiment. However, we desire to have it understood that, within the scope of the appended claims, the invention may be practiced otherwise than as specifically illustrated and described.

We claim:

1. In an extrusion press, a vertical frame, male and female extruding tools slidably disposed in the frame for reciprocation relative to each other, main driving means including a crank disposed in the frame for reciprocating one of said tools, subsidiary driving means operatively connected to the other of said tools and including mechanical means associated with said main driving means, and hydraulic means providing hydraulic cushioning of said other tool during extrusion to relieve extrusion forces from said subsidiary means.

2. In an extrusion press, a vertical frame, an upper male extruding tool and a lower female extruding tool disposed in the frame for reciprocation relative to each other, main driving means including a crank disposed in the bottom of said frame for reciprocating said female tool, subsidiary driving means for effecting reciprocation of said male tool including mechanical means associated with said crank and including hydraulic means to hydraulically cushion said male tool during extrusion and relieve extrusion forces from said male tool.

3. In an extrusion press, a vertical frame, an upper male extruding tool and a lower female extruding tool disposed in the frame for reciprocation of each relative to each other, main driving means including a crank disposed within the frame below the female tool for reciprocating said female tool, subsidiary driving means associated with said male tool to reciprocate it to effect piercing of a billet, said subsidiary means including mechanical means associated with said main driving means controlling actuation of the subsidiary means, and including a source of hydraulic pressure supplying a hydraulic cushion for the male tool during extrusion and thereby relieving extrusion forces from said subsidiary means.

4. In an extrusion press, a vertical frame, an upper male extruding tool reciprocable in the frame, a lower female extruding tool including a billet- and die-carrier reciprocably mounted in the frame and provided with a bore aligned with the tool axis, a crank in the frame below said carrier, and hollow connecting means between said crank and carrier for passage of the article extruded through said bore, and means for driving said crank; subsidiary driving means for said male tool including mechanical means associated with said crank drive controlling actuation of said subsidiary means, and including hydraulic means providing a hydraulic cushion for said male tool during extrusion and relieving extrusion forces from the subsidiary driving means.

5. In an extrusion press, a vertical frame, an upper male extruding tool and a lower female extruding tool disposed in the frame for reciprocation of each relative to each other, main driving means including a crank disposed within the frame below the female tool for reciprocating said female tool, a fixed cross head carried by the frame, subsidiary driving means for said male tool including mechanical means associated with said main driving means controlling actuation of said subsidiary means, and a source of hydraulic pressure to provide a hydraulic cushion between said male tool and cross head during extrusion to thereby relieve extrusion forces from said subsidiary means.

6. In an extrusion press, a vertical frame, an upper male extruding tool reciprocable in the frame, a lower female extruding tool including a billet- and die-carrier reciprocably mounted in the frame and provided with a bore aligned with the tool axis, a crank in the frame below said carrier, and hollow connecting means between said crank and carrier for passage of the article extruded through said bore, and means for driving said crank; a fixed cross head carried by the frame, subsidiary driving means for said male tool including mechanical means associated with said crank drive controlling actuation of said subsidiary means, and hydraulic means providing a hydraulic cushion for said male tool against said cross head during extrusion to relieve extrusion forces from the subsidiary driving means.

7. In an extrusion press, a vertical frame, a female die reciprocable in the lower part of the frame, main driving means operatively connected to said die, a male tool reciprocable in the frame over said female die including a punch holder having a bore projecting downwardly therein, a cylinder member movable in said bore, a punch member connected to said punch holder; a movable cross head, a fixed cross head, a connection between said punch holder and movable cross head governing relative movement of the punch holder and cylinder member subsidiary driving means connected to said movable cross head, means coupling said cylinder member hydraulically to said movable cross head during extrusion to apply to it only such proportion of the extrusion forces as corresponds approximately to the driving force applied to the movable cross head for moving the male tool, and means hydraulically coupling said cylinder member to said fixed cross head to apply to it the balance of the extrusion forces.

8. In an extrusion press, a vertical frame, a female die reciprocable in the lower part of the frame, main driving means including a crank in the frame operatively connected to said female die, a male tool reciprocable over said female die including a punch holder having a bore projecting downwardly therein, a mandrel holder movable in said bore, a hollow punch connected to said punch holder, and a mandrel connected to said mandrel holder extending downwardly through said punch; a movable cross head, a fixed cross head, a connection between said punch holder and movable cross head governing relative movement of the punch and mandrel holders, subsidiary means driving said movable cross head connected to said crank and including means coupling said mandrel holder hydraulically to said movable cross head to apply to it only such proportion of the extrusion forces as corresponds approximately to the driving force applied to the movable cross head for moving the male tool, and also hydraulically coupling the mandrel holder to said fixed cross head to apply to it the balance of the extrusion force.

9. In an extrusion press, a vertical frame, a female die reciprocable in the lower part of the frame, main driving means including a crank in the frame connected to said die, a male tool reciprocable over said female die including a punch holder having a bore projecting downwardly therein, a mandrel holder movable in said bore and provided with a pair of concentric walls forming a pair of cylinders, a hollow punch connected to said punch holder, and a mandrel connected to said mandrel holder extending downwardly through said punch; a movable cross head, a piston depending therefrom movable in one of said cylinders, a fixed cross head, a fixed piston depending therefrom movable in the other of said cylinders, a connection between said punch holder and movable cross head governing relative movement of the punch and mandrel holders, subsidiary means driving said movable cross head connected to said crank, a source of hydraulic pressure supplying hydraulic cushions in said cylinders during extrusion to apply to the movable cross head and subsidiary driving means only such proportion of the extrusion forces as corresponds approximately to the driving force applied to the cross head for moving the male tool, and for coupling the mandrel holder to said fixed cross head to apply to it the balance of the extrusion forces.

10. In an extrusion press, a vertical frame, a lower female extruding tool including a carrier reciprocably mounted in the frame and provided with a longitudinal bore, a billet- and die-container supported on said carrier with its bore aligned with that of the carrier, a crank in the frame below the carrier, and connecting means between the crank and carrier providing a passageway from said bores for the extruded article, and means driving said crank; a fixed cross head in the upper part of the frame, a fixed piston depending from said cross head, an upper male tool including a hollow punch holder reciprocable in the frame, a punch connected to and depending from the punch holder, a hollow mandrel holder movable in said punch carrier and itself movable over said fixed piston, and a mandrel connected to the mandrel carrier extending downwardly through the punch; subsidiary means for reciprocating said male tool including mechanical means associated with said crank drive and a source of hydraulic pressure providing a hydraulic cushion between said mandrel holder and piston during extrusion to relieve extrusion stresses from said subsidiary mechanical means.

11. In an extrusion press, a vertical frame, a carrier reciprocably mounted in the frame and provided with a longitudinal bore, a billet- and die-container supported on said carrier with its bore aligned with the carrier bore, a crank mounted in the frame below said carrier, connecting rod means connecting said crank and carrier and providing a passage from said bores for the extruded article; a fixed cross head in the upper part of the frame, a fixed hollow piston depending from said cross head in the axis of tool movement, male extruding mechanism above said carrier including a hollow punch holder reciprocably mounted in the frame, a punch connected to and depending from said punch holder, a mandrel holder movable in the bore of said punch holder and provided with a pair of upstanding concentric walls forming an outer hydraulic cylinder in which said fixed piston moves and also forming an inner cylinder, a link connection between said holders governing their relative movement, a mandrel connected to said mandrel holder extending downwardly through said punch; a movable cross head, a piston depending from said movable cross head for movement in said inner cylinder, a source of hydraulic pressure fluid, pipe connections between said hydraulic pressure fluid source and said inner and outer cylinders, flow-controlling means in said pipes, and subsidiary driving means including cam mechanism associated with said crank and operatively connected to said movable cross head, and including mechanism associated with said carrier and said source of pressure fluid for controlling flow thereof, said subsidiary means controlling movements of the male tool parts and providing fluid cushions in said cylinders during extrusion whereby to distribute extrusion stresses between said fixed cross head and the subsidiary driving means.

12. A press according to claim 11, the cross sectional areas of said cylinders and pistons being proportioned so that the extrusion force applied to the subsidiary driving means through the hydraulic cushion in the inner cylinder of the mandrel holder does not materially exceed the force applied mechanically to said subsidiary means in moving the male tools to operating positions.

13. In an extrusion press, a vertical frame, a carrier member reciprocably mounted in the frame and provided with a longitudinal bore, a billet- and die-container supported on said carrier with its bore aligned with the carrier bore, a crank mounted in the frame below said carrier, connecting rod means connecting said crank and carrier and providing a passage from said bores for the extruded article; a fixed cross head in the upper part of the frame, a fixed hollow piston depending from said cross head in the axis of tool movement, male extruding mechanism above said carrier including a hollow punch holder reciprocably mounted in the frame, a punch connected to and depending from said punch holder, a mandrel holder movable in the bore of said punch holder and provided with a pair of upstanding concentric walls forming an outer hydraulic cylinder in which said fixed piston moves and also forming an inner cylinder, a link connection between said holders governing their relative movement, and a mandrel connected to said mandrel holder extending downwardly through said punch; a movable cross head, a piston depending from the movable cross head through the bore of said fixed cross head for movement in said inner cylinder, a source of hydraulic pressure fluid, a pipe connection between said hydraulic pressure fluid source and said outer cylinder, a flow-controlling valve in said pipe, a branch connection to said inner cylinder, a one-way valve in said branch connection permitting flow of fluid only from said source into said branch connection, and subsidiary driving means including cams associated with said cranks, thrust rods connected to cams and said movable cross head, and cam mechanism associated with said carrier and said flow-controlling valve, said subsidiary means controlling movements of the male tool parts and actuating the hydraulic pressure source to provide fluid cushions in said cylinders during extrusion and thereby distribute the extrusion forces, the cross sectional areas of said cylinders and pistons being proportioned to apply most of the force to the fixed cross head and restrict the force applied to the subsidiary driving means to not substantially exceed the mechanical force applied to said means for moving the male tool parts.

14. In an extrusion press, a vertical frame, a carrier mounted for reciprocation in said frame and provided with a longitudinal bore, a billet- and die-container supported by said carrier with its bore aligned with that of said carrier, a crank mounted in said frame below said carrier, a hollow connecting member connected to said carrier and crank and providing a passage from said bores for the extruded article, a fixed cross head in the upper part of said frame, a hollow fixed piston depending from said cross head in the axis of tool movement, male tool extruding mechanism including a hollow punch holder reciprocably mounted in the frame above said carrier, a punch connected to and depending from said holder, a hollow member mounted within the bore of said punch holder and moving as a piston therein and having its bore surrounding and acting as a hydraulic cylinder for said fixed piston, a mandrel connected to said mandrel holder extending downwardly through said punch, and a connection between said punch holder and hollow member coordinating their movements; and subsidiary driving means including a hydraulic pressure cylinder, a pipe connection between said pressure cylinder and the bore of said fixed piston, a piston movable in said pressure cylinder, valve means associated with the bore of said fixed piston controlling flow of pressure fluid, and actuating means comprising a second crank associated with said main crank, a connection between said second crank and said movable piston, and means associated with said valve for cutting off flow of pressure fluid during extrusion to provide a hydraulic cushion between said hollow member and said fixed piston during extrusion to eliminate extrusion forces from said subsidiary driving means.

15. A press according to claim 14, and subsidary hydraulic means connected to said hollow member for elevating the hollow member and mandrel holder after the end of the extrusion operation.

16. In an extrusion press, a vertical frame, a carrier member mounted for reciprocation in said frame and provided with a longitudinal bore, a billet- and die-container supported by said carrier with its bore aligned with that of said carrier, a crank mounted in said frame below said carrier, a hollow connecting member connected to said carrier and crank and providing a passage from said bores for the extruded article, a fixed cross head in the upper part of said frame, a hollow fixed piston depending from said cross head in the axis of tool movement, male tool extruding mechanism including a hollow punch holder reciprocably mounted in the frame, a punch connected to and depending from said holder, a hollow mandrel holder mounted within said punch holder and moving as a piston therein and having its bore surrounding and acting as a hydraulic cylinder for said fixed piston, a mandrel connected to said mandrel holder extending downwardly through said punch, and a connection between said punch holder and mandrel holder for coordination of movements of said holders; and subsidiary driving means including a hydraulic pressure cylinder, a pipe connecting said hydraulic cylinder and the bore of said fixed piston, a valve in said pipe, a pipe connecting said pressure piston to a source of low pressure water, a valve in said low pressure water pipe, a by-pass pipe connection between said pipes, a valve in said by-pass pipe, a piston movable in the hydraulic pressure cylinder, and actuating means including a second crank associated with said main crank, a rod connection between said second crank and said pressure piston, and means associated with said rod and valves for cutting off flow of pressure fluid during extrusion to provide a hydraulic cushion between said mandrel holder and said fixed piston during extrusion to eliminate extrusion forces from said subsidiary driving means.

FRITZ SINGER.
ALFRED LIEBERGELD.